United States Patent [19]

Yoshimura et al.

[11] Patent Number: 5,235,450
[45] Date of Patent: Aug. 10, 1993

[54] LIQUID CRYSTAL DISPLAY APPARATUS WITH POSITIVE AND NEGATIVE PHASE PLATES WITH SPECIFIC POSITIONS OF SLOW AXES

[75] Inventors: Yumi Yoshimura, Yamatokoriyama; Hiroshi Ohnishi, Nara; Toshiyuki Yoshimizu, Ikoma; Keiko Kishimoto, Osaka, all of Japan

[73] Assignee: Sharp Kabushiki Kaisha, Osaka, Japan

[21] Appl. No.: 766,510

[22] Filed: Sep. 27, 1991

[30] Foreign Application Priority Data

Sep. 28, 1990 [JP] Japan .................................. 2-262378

[51] Int. Cl.⁵ .......................................... G02F 1/1335
[52] U.S. Cl. .......................................... 359/63; 359/73
[58] Field of Search .................................. 359/73, 63

[56] References Cited

U.S. PATENT DOCUMENTS

| 5,124,824 | 6/1992 | Kozaki et al. | 359/53 |
| 5,126,866 | 6/1992 | Yoshimizu et al. | 359/63 |
| 5,138,474 | 8/1992 | Arakawa | 359/73 |

FOREIGN PATENT DOCUMENTS

| 0367288 | 5/1990 | European Pat. Off. | 359/73 |
| 0372973 | 6/1990 | European Pat. Off. | 359/73 |
| 0379315 | 7/1990 | European Pat. Off. | |
| 0424951 | 9/1990 | European Pat. Off. | |
| 0067518 | 3/1990 | Japan | 359/73 |
| 3-13917 | 1/1991 | Japan | 359/73 |
| 3-73921 | 3/1991 | Japan | |
| 3-269412 | 12/1991 | Japan | 359/73 |

Primary Examiner—William L. Sikes
Assistant Examiner—Anita P. Gross

[57] ABSTRACT

A liquid crystal display apparatus includes a twist supertwisted nematic liquid crystal panel (1) including a liquid crystal layer (8) provided between first and second transparent substrates (2, 3), and a first phase plate group (11; 13, 14) including at least one uniaxially stretched polymer film arranged on the outer surface of the first substrate (2). The apparatus further includes a first polarizing plate (9) arranged on the first phase plate group (11; 13, 14) and a second phase plate group (12; 15, 16) including at least one uniaxially stretched polymer film arranged on the outer surface of the second substrate (3) and. Finally, the apparatus includes a second polarizing plate (10) arranged on the second phase plate group (12; 15, 16), wherein at least one of the uniaxially stretched polymer films (11, 12; 13, 14, 15, 16) has positive optical anisotropy and the others have negative optical anisotropy.

23 Claims, 17 Drawing Sheets

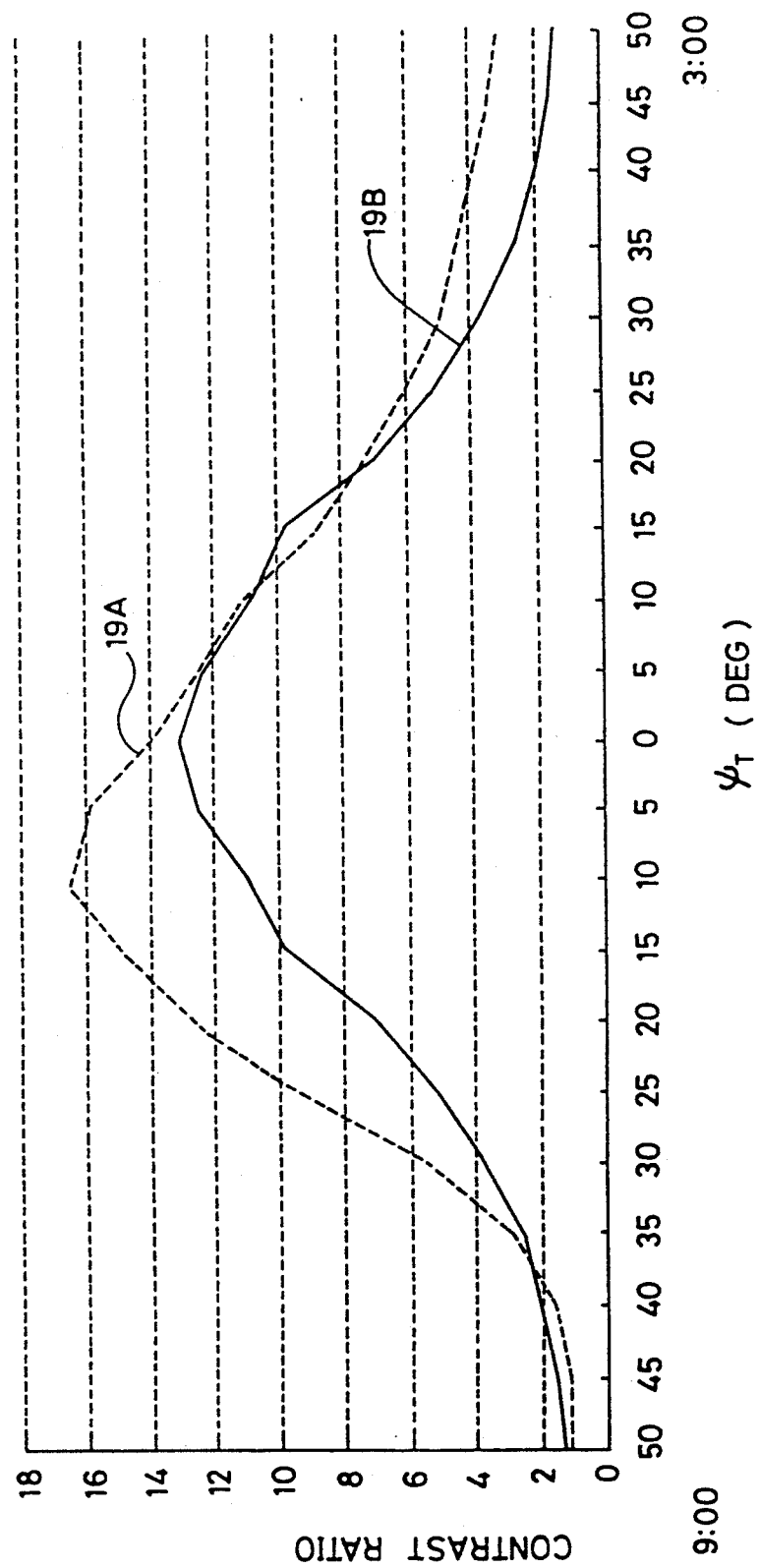

LIQUID CRYSTAL DISPLAY APPARATUS WITH POSITIVE AND NEGATIVE PHASE PLATES WITH SPECIFIC POSITIONS OF SLOW AXES

BACKGROUND OF THE INVENTION

Field of the Invention

The present invention relates generally to liquid crystal display apparatuses, and more particularly, to the improvement in prevention of coloring and contrast of supertwist type liquid crystal display apparatuses.

Description of the Background Art

In general, a supertwist type liquid crystal display apparatus, which is apt to have its display colored yellow green or blue, employs achromatization by using an optical compensator to obtain bright and clear black and white display. Such technique improves the quality of the display of a supertwist type liquid crystal display apparatus to be employed as a display device for use in office automation equipment such as word processors and computer systems.

Known as a supertwist type liquid crystal display apparatus achromatized is a display apparatus including two-layered supertwist type liquid crystal panels. In such a two-layered liquid crystal display apparatus, coloring in the first-layer liquid crystal panel for display is achromatized by the second-layer liquid crystal panel for optical compensation. The two-layered type liquid crystal display apparatus, however, requires another liquid crystal panel in addition to an ordinary one-layer type liquid crystal display apparatus, resulting in an increase in thickness and weight of the apparatus.

In order to solve such problem, many have proposed a thin and light in weight liquid crystal display apparatus of a supertwist type achromatized by using an optical phase plate made of an uniaxially stretched organic polymer film as an optical compensator, such as that described in Japanese Patent Application No. 1-262624 (Japanese Patent Laying-Open No. 3-73921: laid open Mar. 28, 1991). The invention disclosed in Japanese Patent Laying-Open No. 3-73921 had not been known to public before the priority date of the present application. Compared with a two-layered liquid crystal display apparatus comprising a liquid crystal panel for optical compensation having the direction of rotary polarization opposite to that of a liquid crystal panel for display, such a liquid crystal display apparatus comprising a phase plate as disclosed in Japanese Patent Laying-Open No. 3-73921 is more liable to cause coloring depending on a viewing angle to narrow a preferable range of viewing angle in which achromatic display can be achieved.

The reason why a uniaxially stretched polymer film is used as a phase plate is that it has optical anisotropy. That is, the uniaxially stretched polymer film has birefringence and different retractive indexes with respect to the stretching direction and the direction perpendicular to the same. The birefringence phenomenon is caused because an optical anisotropic substance has different refractive indexes for different linearly polarized lights having different oscillation planes. Light having a phase velocity (or a refractive index) changing depending on a direction of its propagation in an optical medium is referred to as an extraordinary ray and light having a fixed phase velocity irrespective of its propagation direction is referred to as an ordinary ray. Then, a phase difference resulting from a difference between a phase velocity of an ordinary ray and that of an extraordinary ray is referred to as "phase retardation".

Such a well-known relationship as follows is established among a retardation R, a refractive index $n_e$ of an extraordinary ray, a refractive index $n_o$ of an ordinary ray and a thickness d of a phase plate.

$$R = \Delta n \times d, \quad \Delta n = |n_e - n_o|$$

Retardation $\Delta n \cdot d$ determined by a product of refractive index anisotropy $\Delta n$ and a thickness d of a phase plate is a physical quantity determining a phase difference caused by light passing through the phase plate. The retardation value varies dependent not only on a tilt angle, but also on an azimuth angle at which a phase plate is viewed.

FIG. 1 shows a tilt angle $\psi_T$ and an azimuth angle $\psi_A$ at which a phase plate PH is viewed. For example, when a stretching direction of a phase plate made of a uniaxially stretched polycarbonate film is coincident with an azimuth angle $\psi_A = 0°$, the retardation is reduced as a tilt angle $\psi_T$ is increased with $\psi_A = 0°$. However, with an azimuth angle $\psi_A = 90°$, which is perpendicular to the stretching axis, the retardation is increased as the tilt angle $\psi_T$ is increased.

When, in achromatizing display by combining such a phase plate and a liquid crystal display panel, even if the retardation $\Delta n \cdot d$ is set so as to obtain perfect achromatization with a tilt angle $\psi_T = 0°$, compensation relation between retardation of the phase plate and that of the liquid crystal panel is broken with the increase of the tilt angle $\psi_T$. That is, an increase in a tilt angle $\psi_T$ of the viewing direction causes coloring of the display of the liquid crystal display apparatus to lower contrast of the same, resulting in a narrow preferable range of a viewing angle.

SUMMARY OF THE INVENTION

In view of the above-described related art, an object of the present invention is to provide a thin and light liquid crystal display apparatus of a supertwist type capable of obtaining clear achromatic display with sufficient contrast in a wide range of a viewing angle.

The liquid crystal display apparatus according to the present invention includes a supertwist type liquid crystal panel including a liquid crystal layer provided between first and second transparent substrates, a first phase plate group including at least one uniaxially stretched polymer film arranged on the outer surface of the first substrate, a first polarizing plate arranged on the first phase plate group, a second phase plate group including at least one uniaxially stretched polymer film arranged on the outer surface of the second substrate, and a second polarizing plate arranged on the second phase plate group, and at least one of the polymer films having positive optical anisotropy and the others having negative optical anisotropy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a graph showing a contrast ratio of display depending on a tilt angle $\psi_T$ along the direction of 3:00-9:00 in the liquid crystal display apparatus of FIG. 17.

DESCRIPTION OF THE PREFERRED EMBODIMENTS

A relative phase difference between an ordinary ray and an extraordinary ray having passed a supertwist type liquid crystal display panel is compensated by retardation $\Delta n \cdot d$ due to a phase plate, or phases of all the light waves are matched, thereby preventing coloring of display. Retardation $\Delta n \cdot d$ of a phase plate is usually selected so as to prevent coloring when seen from the direction vertical to the display surface of the liquid crystal display apparatus, that is, the direction of a tilt angle $\psi_T = 0°$. However, when the liquid crystal display apparatus is seen at an oblique angle, that is, from the direction with a tilt angle $\psi_T \neq 0°$, the retardation $\Delta n \cdot d$ of the phase plate is changed from that at the tilt angle $\psi_T = 0°$.

That is, when the tilt angle $\psi_T$ is not $0°$, a refractive index of the phase plate in a three-dimensional direction should be taken into consideration. It is assumed herein that a stretching axis of a uniaxially stretched phase plate is set to have an azimuth angle $\psi_A = 0°$ and refractive indices of the stretching axis ($\psi_A = 0°$), the direction perpendicular to the stretching axis ($\omega_A = 90°$) and the direction of the thickness of the phase plate ($\psi_T = 0°$) are represented as $N_{MD}$, $N_{TD}$ and $N_{ZD}$, a phase plate of a polycarbonate film, for example, has $N_{MD} = 1.589$, $N_{TD} = 1.581$ and $N_{ZD} = 1.581$ to establish the following relations.

$$N_{MD} > N_{TD} = N_{ZD},$$

$$(N_{MD} + N_{TD}) > 2N_{ZD}$$

Another phase plate of a polystyrene film has $N_{MD} = 1.579$, $N_{TD} = 1.587$ and $N_{ZD} = 1.585$ to establish the following relations.

$$N_{MD} > N_{TD} > N_{ZD}$$

$$(N_{MD} + N_{TD}) < 2N_{ZD}$$

In general, a phase plate having positive optical anisotropy has a relation that $(N_{MD} + N_{TD}) > 2N_{ZD}$, while a phase plate having negative optical anisotropy has a relation that $(N_{MD} + N_{TD}) < 2N_{ZD}$.

In general, refractive index anisotropy $\Delta N$ and a phase difference R when seen from the tilt direction ($\psi_T \neq 0°$) are expressed as follows.

(1) In a case where $\psi_A = 0°$ and $\psi_T \neq 0°$:

$$\Delta N = \{N_{MD}^2 N_{ZD}^2 / (N_{MD}^2 \sin^2 \psi_T + N_{ZD}^2 \cos^2 \psi_T)\}^{\frac{1}{2}} - N_{TD}$$

$$R = \Delta N_{MD} \cdot d / \cos \psi_T$$

(2) In a case where $\psi_A = 90°$ and $\psi_T \neq 0°$:

$$\Delta N = N_{MD} - \{N_{TD}^2 N_{ZD}^2 / (N_{TD}^2 \sin^2 \psi_T + N_{ZD}^2 \cos^2 \psi_T)\}^{\frac{1}{2}}$$

$$R = \Delta N_{TD} \cdot d / \cos \psi_T$$

Figure 1:
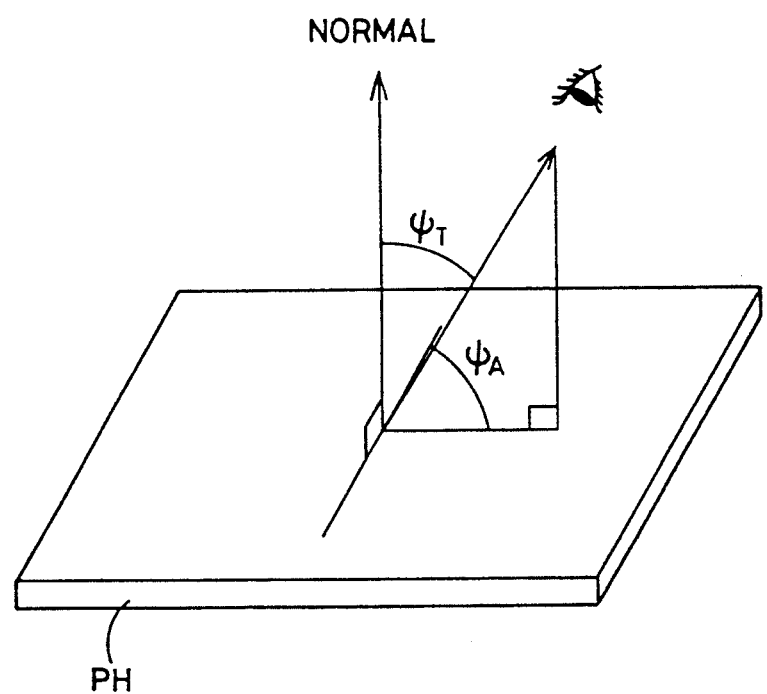
FIG. 1 is a perspective view showing a tilt angle $\psi_T$ and an azimuth angle $\psi_A$ with respect to a phase plate.
Figure 2A:
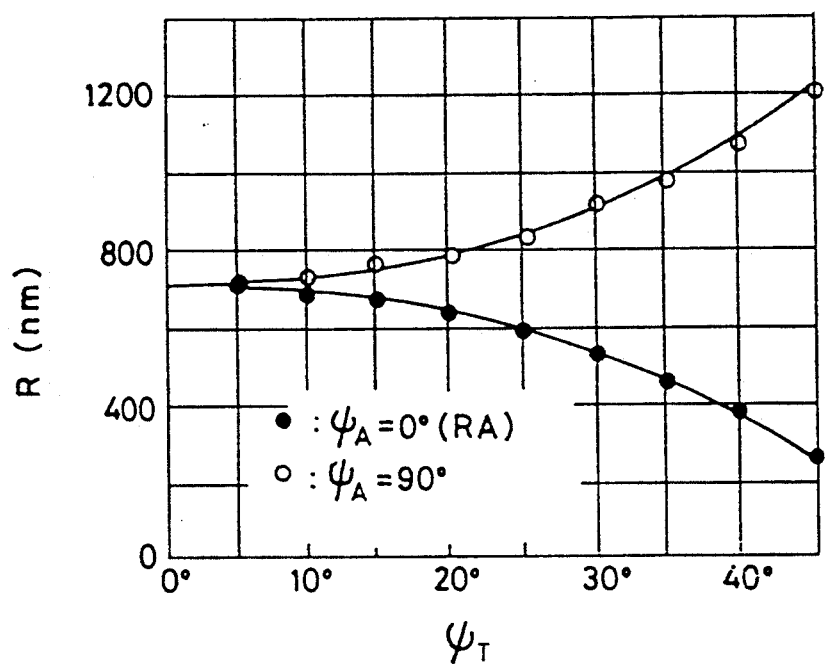
FIG. 2A is a graph showing a relationship between a tilt angle $\psi_T$ and retardation R in an uniaxially stretched polymer film having positive optical anisotropy.

The graph of FIG. 2A shows the retardation R, obtained by the above-described theoretical formulas, of the phase plate made of a polycarbonate film having positive optical anisotropy with respect to a tilt angle $\psi_T$. In this graph, the abscissa represents a tilt angle $\psi_T$ (deg.) and the ordinate represents retardation R (nm). The curve defined by marks ● shows change of retardation R when a tilt angle $\psi_T$ is changed toward the stretching direction ($\psi_A = 0°$), which is the direction of a slow axis SA of a positive phase plate, while the curve defined by the marks ○ shows change of retardation R when a tilt angle $\psi_T$ is changed toward a direction ($\psi_A=90°$) which is a direction of a fast axis of the positive phase plate and is perpendicular to the stretching direction. As can be seen from FIG. 2A, the positive phase plate has the retardation R reduced with an increase of the tilt angle $\psi_T$ toward the direction of the slow axis SA ($\psi_A=0°$) and the retardation R increased with an increase of the tilt angle $\psi_T$ toward the direction of the fast axis ($\psi_A=90°$).

Figure 2B:
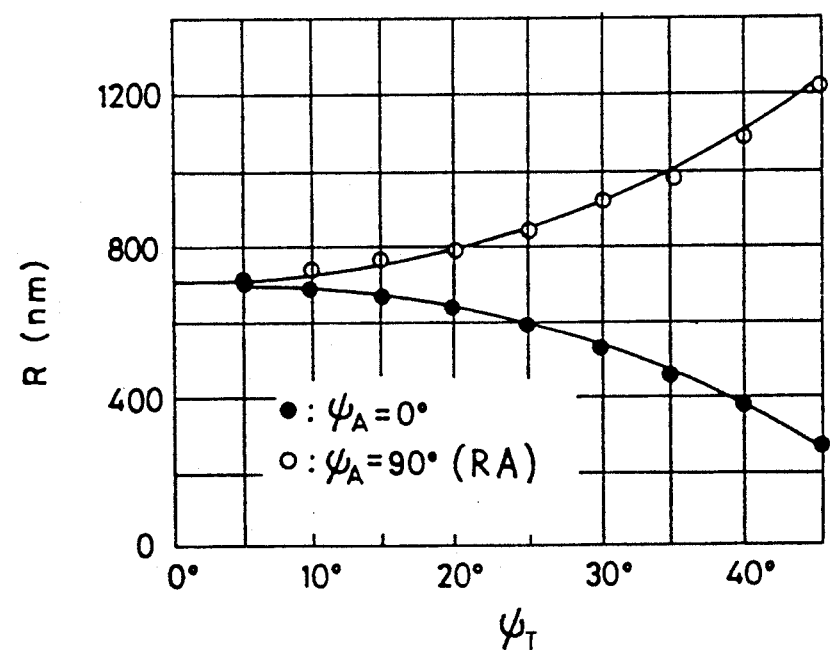
FIG. 2B is a graph showing a relationship between a tilt angle $\psi_T$ and retardation R in an uniaxially stretched polymer film having negative optical anisotropy.

FIG. 2B shows, similar to FIG. 2A, a relationship between retardation R of a phase plate made of a polystyrene film having negative optical anisotropy and a tilt angle $\psi_T$. As indicated by the curve defined by the marks ●, as the tilt angle $\psi_T$ increases toward the stretching direction ($\psi_A=0°$), which is the direction of a fast axis of the negative phase plate, the retardation R is reduced, while as indicated by the curve defined by the marks ○, as the tilt angle $\psi_T$ increases toward the direction ($\psi_A=90°$) which is the direction of the slow axis SA of the negative phase plate and is perpendicular to the stretching direction, the retardation R is increased.

Figure 3:
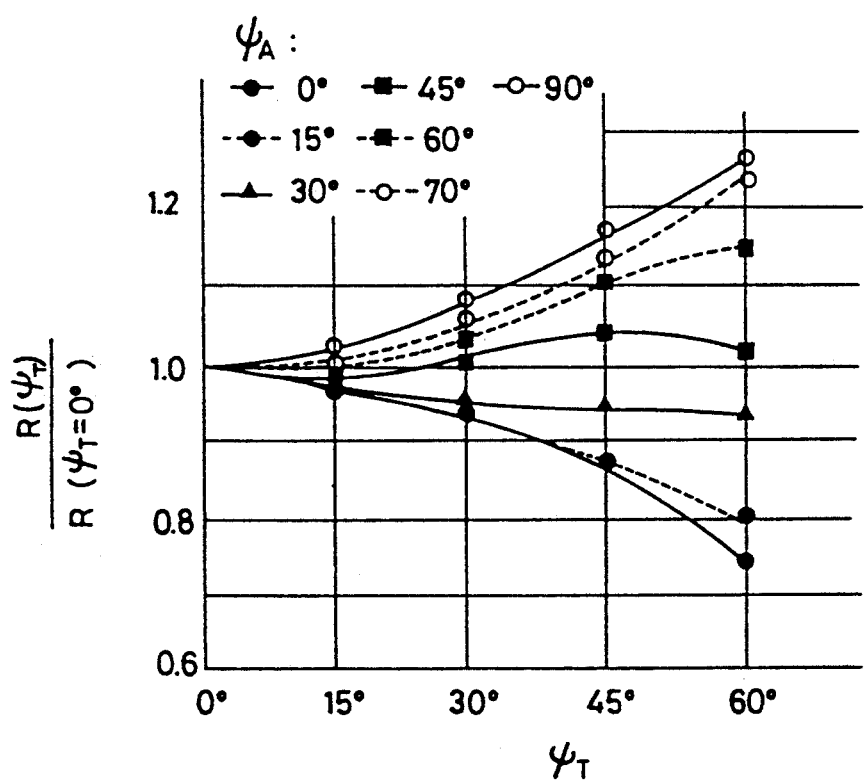
FIG. 3 is a graph showing orientation dependency of measured retardation of a polycarbonate film having positive optical anisotropy.

The graph of FIG. 3 shows the retardation R of a phase plate made of a polycarbonate film measured by using the Senarmont method with respect to a tilt angle $\psi_T$. The abscissa represents a tilt angle $\psi_T$ and the ordinate represents the retardation ratio $R(\psi_T)/R(\psi_T=0°)$ normalized by the retardation value R ($\psi_T=0°$) when $\psi_T$ is 0°. The angles corresponding to the respective curves and shown at the upper part of the graph represent an azimuth angle $\psi_A$. It can be seen that the measured viewing angle dependency of the retardation shown in FIG. 3 is coincident with the tendency shown in FIG. 2A obtained by the theoretical formulas.

Figure 4:
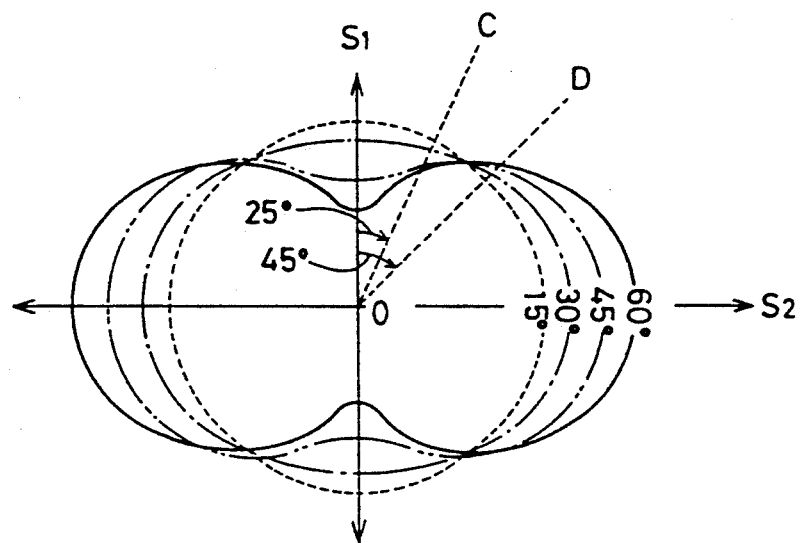
FIG. 4 is a diagram showing dependency of retardation of a phase plate on an azimuth angle $\psi_T$.

FIG. 4 illustrated based on the data shown in FIG. 3, shows dependency of retardation R on an azimuth angle $\psi_A$ in the cases where a tilt angle $\psi_T$ is 15°, 30°, 40° and 60°. S1 corresponds to the direction of a phase slow axis of a polycarbonate film and a distance between each point on each curve and the origin 0 is proportional to a retardation ratio $R(\psi_T)/R(\psi_T=0°)$. It can be seen from FIG. 4 that when a viewing angle is within the range of <COD, that is, when the azimuth angle $\psi_A$ is from 25° to 45°, the retardation R has a little dependence on the tilt angle $\psi_T$. The orientation dependency of the retardation R of the negative phase plate is similar to that shown in FIG. 4, with the slow axis axis S2 corresponding to a horizontal direction.

Figure 5:
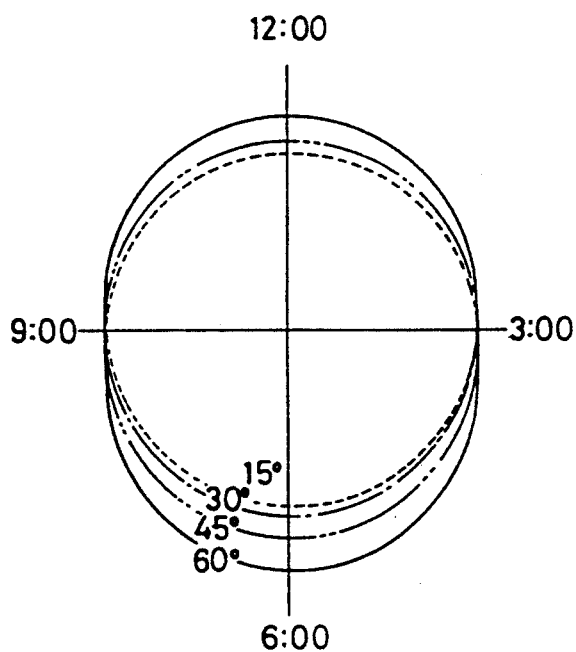
FIG. 5 is a diagram showing one example of orientation dependency of retardation in a supertwist type liquid crystal display panel.

FIG. 5, similar to FIG. 4, shows one example of the orientation dependency of the retardation R of a supertwist type liquid crystal display panel. The direction of 12:00-6:00 corresponds to a vertical direction of the rectangular-shaped display surface of a liquid crystal panel and the direction of 3:00-9:00 corresponds to a lateral direction.

As can be seen from FIGS. 4 and 5, the orientation dependency of retardation of a phase plate in general differs from that of a liquid crystal panel. Thus, even in a liquid crystal display apparatus in which a liquid crystal panel is combined with a phase plate having retardation for preventing coloring of display when seen from the normal line of the liquid crystal panel, an optical compensation relationship between the phase plate and the liquid crystal panel is broken when seen at an oblique angle ($\psi_T \neq 0°$). It is therefore desirable to reduce the orientation dependency of retardation of the phase plate in order to increase the range of a viewing angle causing no coloring in the display.

As indicated by the marks ● in FIG. 2A, the retardation of the positive phase plate in the slow axis direction SA (the stretching direction: $\psi_A=0°$) is reduced with the increase of the tilt angle $\psi_T$, while the retardation of the negative phase plate in the slow axis SA (the direction perpendicular to the stretching direction: $\psi_A=90°$) is increased with the increase of the tilt angle $\psi_T$ as indicated by the marks ○ in FIG. 2B. It can be understood from the foregoing that the orientation dependency of the retardation of a positive phase plate can be compensated by a negative phase plate having the reverse orientation dependency in order to increase the range of a viewing angle causing no coloring in display.

A uniaxially stretched film of polycarbonate or polyvinyl alcohol can be used as a positive phased plate. As a negative phase plate, a uniaxially stretched film can be used, such as PMMA (polymethyl metacrylate), EMAA (ethylene methacrylic acid), PS (polystyrene) and the like.

Figure 6:
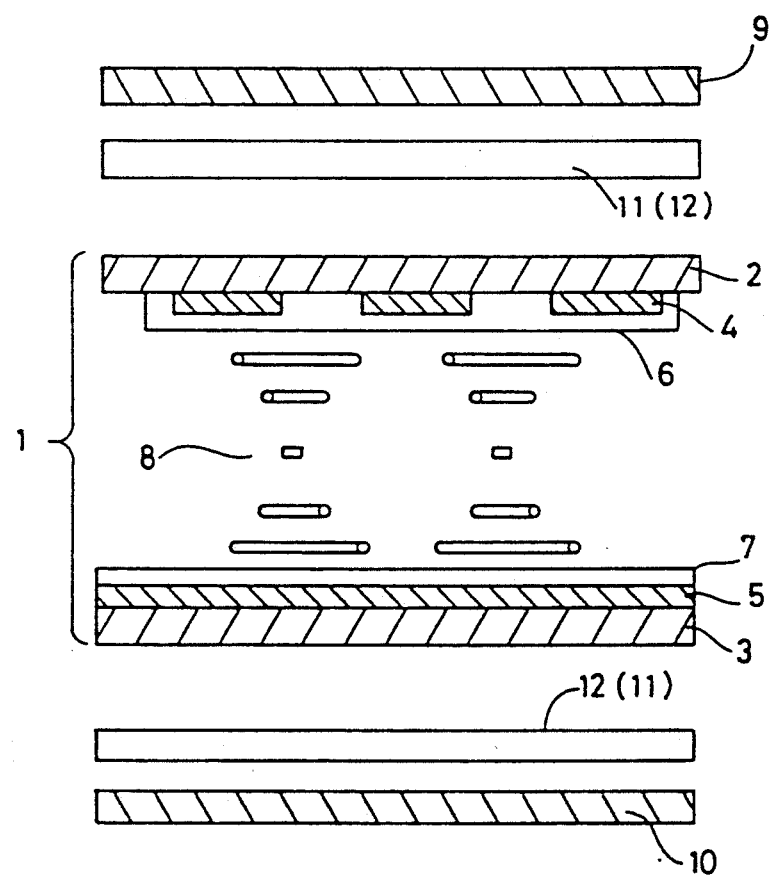
FIG. 6 is an exploded sectional view showing a liquid crystal display apparatus according to a first embodiment of the present invention.

FIG. 6 shows an exploded sectional view showing a liquid crystal display apparatus according to a first embodiment of the present invention. The liquid crystal display apparatus comprises a supertwist type liquid crystal panel 1. The liquid crystal panel 1 includes an upper glass substrate 2 and a lower glass substrate 3. A transparent electrode (e.g., ITO) 4 having a predetermined pattern and an organic orienting film 6 covering the transparent electrode 4 are formed on the lower surface of the upper glass substrate 2. Similarly, a transparent electrode 5 having a predetermined pattern and an organic orienting film 7 covering the transparent electrode 5 are formed on the upper surface of the lower glass substrate 3.

A nematic liquid crystal layer 8 having positive dielectrical anisotropy is provided between the upper and the lower organic orienting films 6 and 7. The orienting axes (rubbing axes) of the two organic orienting films 6 and 7 are set such that the liquid crystal layer 8 has a twist arrangement through 240°. As the nematic liquid crystal layer 8, mixed liquid crystal can be used, which is the mixture of 1.45 wt. % of choresteryl nonanoate (CN) as chiral dopant for controlling the twist direction and phenylcyclohexane (PCH) type liquid crystal, for example. Such mixed liquid crystal has refractive index anisotropy $\Delta n$ of 0.123 and a thickness of the liquid crystal layer 8 is set to 7.5 $\mu m$, for example.

Stacked on the upper surface of the supertwist type liquid crystal panel 1 is a negative phase plate 11 of a uniaxially stretched polystyrene film, for example, on which plate a polarizing plate 9 is provided. The phase plate 11 has a thickness of 50 $\mu m$ and retardation of 420 nm, for example. Stacked on the lower surface of the liquid crystal panel 1 is a positive phase plate 12 of a polycarbonate film, for example, on which plate a polarizing plate 10 is provided. The positive phase plate 12 also has a thickness of 50 $\mu m$ and a retardation of 420 nm. A neutral gray type polarizing plate having a transmittance of 42% and the degree of polarization of 99.99% can be used as the polarizing plates 9 and 10.

Figure 7:
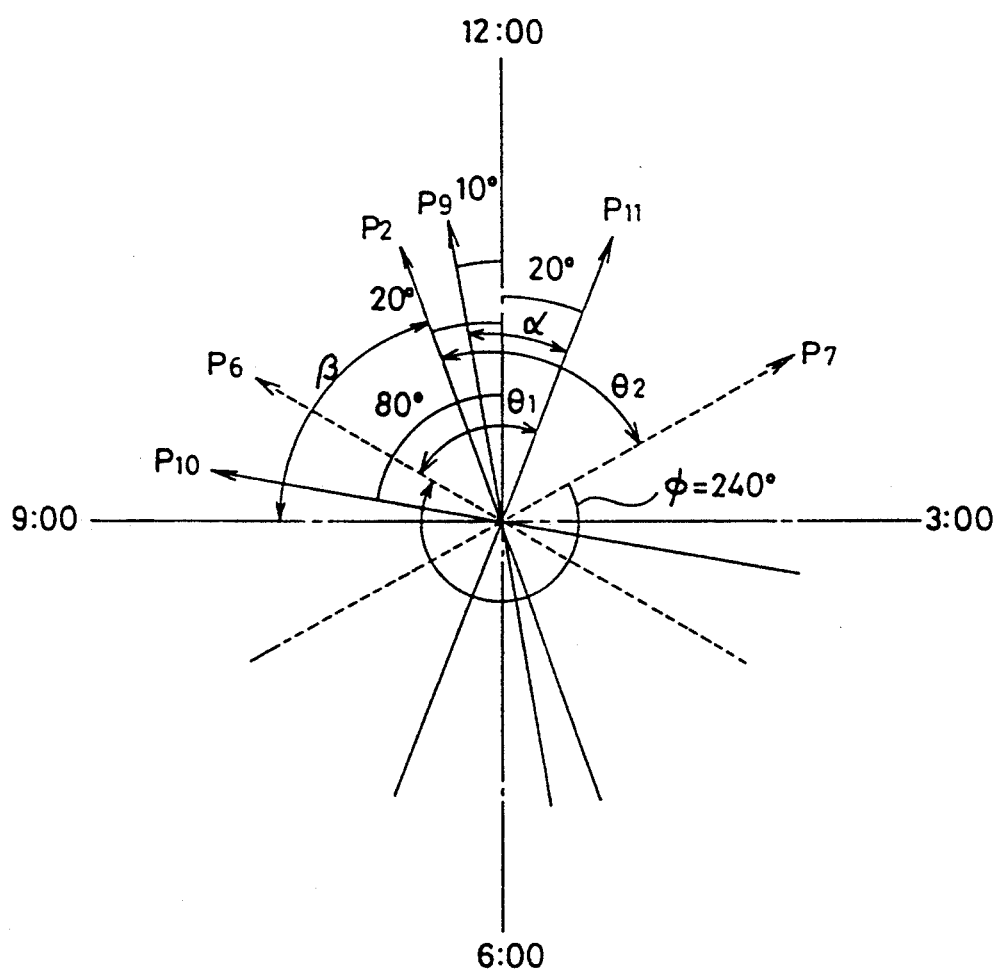
FIG. 7 is a diagram showing one example of an optical orientational relationship among components of the liquid crystal display apparatus of FIG. 6.

FIG. 7 shows one example of an optical orientational relationship among the components of the liquid crystal display apparatus shown in FIG. 6. In the drawing, the line 12:00-6:00 corresponds to the vertical direction of the rectangular-shaped liquid crystal panel and the line 3:00-9:00 corresponds to the lateral direction. The lines P6 and P7 represent liquid crystal molecule orienting axes (rubbing axes) of the upper orienting film 6 and the lower orienting film 7, respectively, and the line P6 is twisted clockwise by 240° from the line P7.

The lines P9 and P10 represent the absorption axis directions of the upper and the lower polarizing plates 9 and 10, respectively. The lines P11 and P12 represent the slow axis directions of the upper negative phase plate 11 and the lower positive phase plate 12, respectively.

Figure 8:
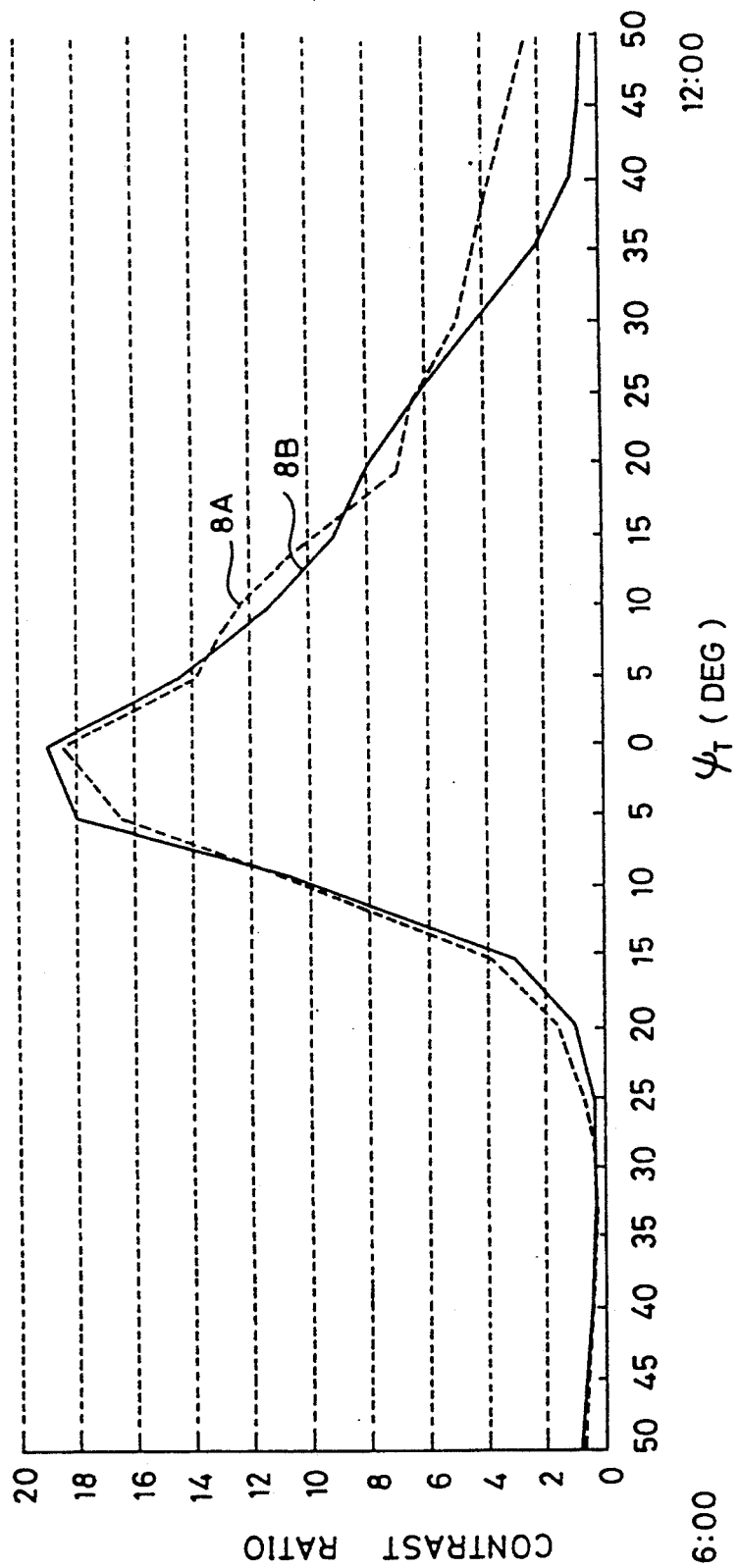
FIG. 8 is a graph showing a contrast ratio of display depending on a tilt angle $\psi_T$ along the direction of 12:00-6:00 in the liquid crystal display apparatus of FIG. 6.

The graph of FIG. 8 shows a contrast ratio of display with respect to a tilt angle $\psi_T$ along the direction of 12:00–6:00. The abscissa represents the tilt angle $\psi_T$ along the direction of 12:00–6:00, while the ordinate represents a contrast ratio. The curve 8A shows a contrast ratio of the liquid crystal display apparatus of FIG. 6, while the curve 8B shows a contrast ratio of the liquid crystal display apparatus of Japanese Patent Laying-Open No. 3-73921. The liquid crystal display apparatus according to Japanese Patent Laying-Open No. 3-73921, similar to the display apparatus of FIG. 6, has a positive phase plate replacing the upper negative phase plate 11.

In the graph of FIG. 8, the range of the tilt angle $\psi_T$ at which a contrast ratio of 4 or more can be obtained is within 54° for the curve 8A and within 45° for the curve 8B. That is, the range of a viewing angle in which a contrast ratio of 4 or more can be obtained in the liquid crystal display apparatus of FIG. 6 is 1.2 times that of the display apparatus according to Japanese Patent Laying-Open No. 3-73921.

Figure 9A:
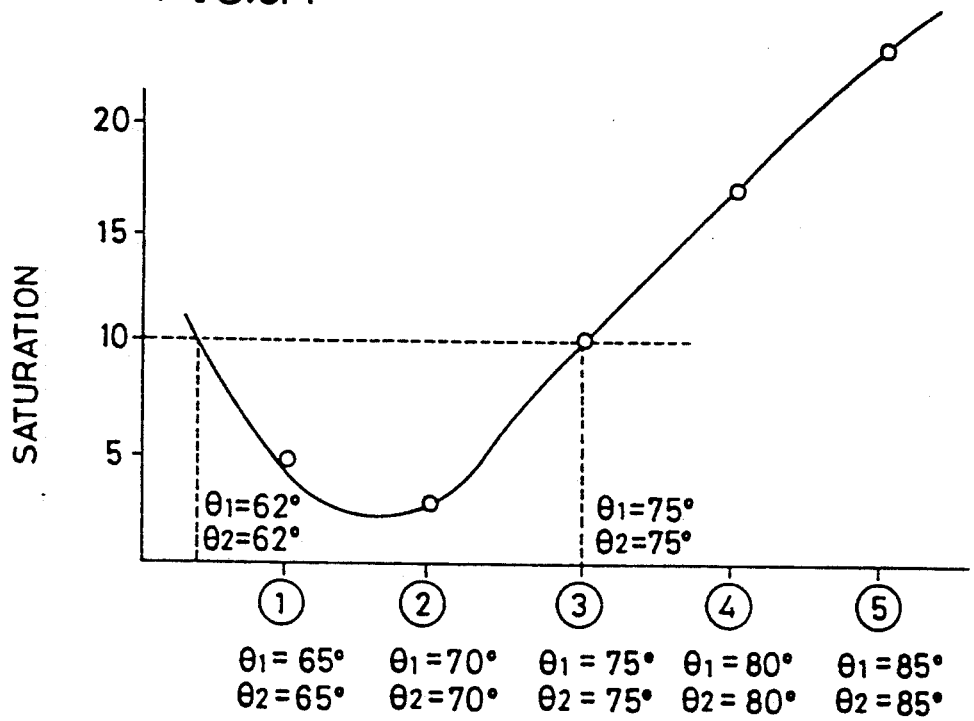
FIGS. 9A and 9B are graphs showing saturation depending on an angle of an orienting axis of a liquid crystal molecule orienting film to a phase retarding axis of a phase plate.
Figure 9B:
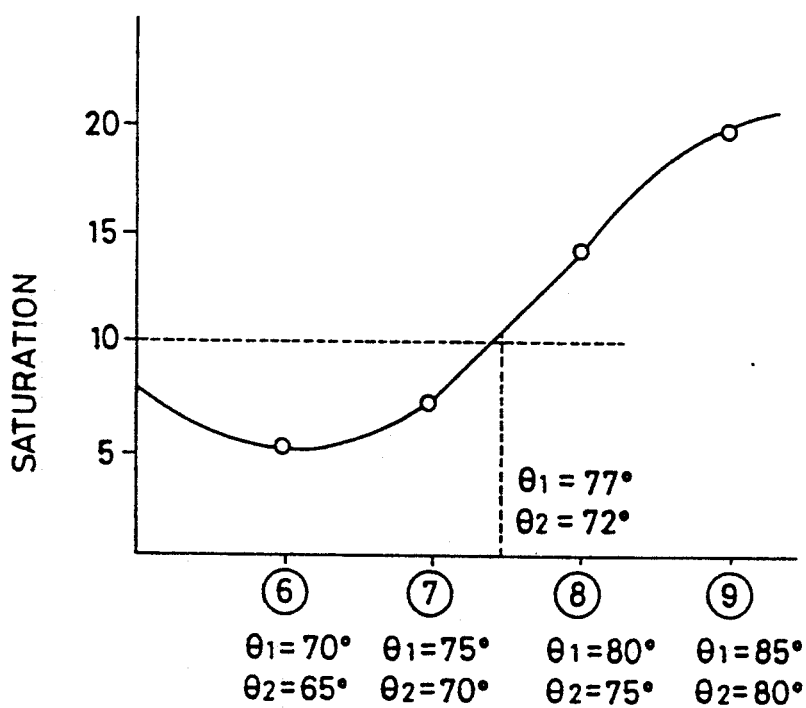

The graphs of FIGS. 9A and 9B respectively show a relation between saturation of display and an angle $\theta 1$, and a relation between saturation of display and an angle $\theta 2$ when an on-voltage is applied to the display apparatus of FIG. 6, with $\theta 1$ being an angle of the orienting axis P6 of the upper orienting film 6 to the phase retarding axis P11 of the negative phase plate 11, $\theta 2$ being an angle of the orienting axis P7 of the lower orienting film 7 to the slow axis P12 of the positive phase plate 12 and the other orientational relations not changed in FIG. 7. In each of these graphs, the abscissa represents the angles $\theta 1$ and $\theta 2$ and the ordinate represents saturation at the tilt angle $\psi_T$ of 0°. "Saturation" represents the degree of white in hue. The saturation value of 10 is the upper limit of the value enabling identification, by a person, of the display as white. That is, the saturation below 10 corresponds to desirable white.

It can be seen from FIG. 9A that $\theta 1$ is set to be $\theta 2$ and saturation becomes 10 or below in the range of $62° \leq \theta 1 = \theta 2 \leq 75°$. On the other hand, it can be seen from FIG. 9B that $|\theta 1 - \theta 2|$ is set to be 5° and saturation becomes 10 or below in the range of $62° \leq \theta 1 \leq 77°$ and in the range of $57° \leq \theta 2 \leq 72°$.

Figure 10:
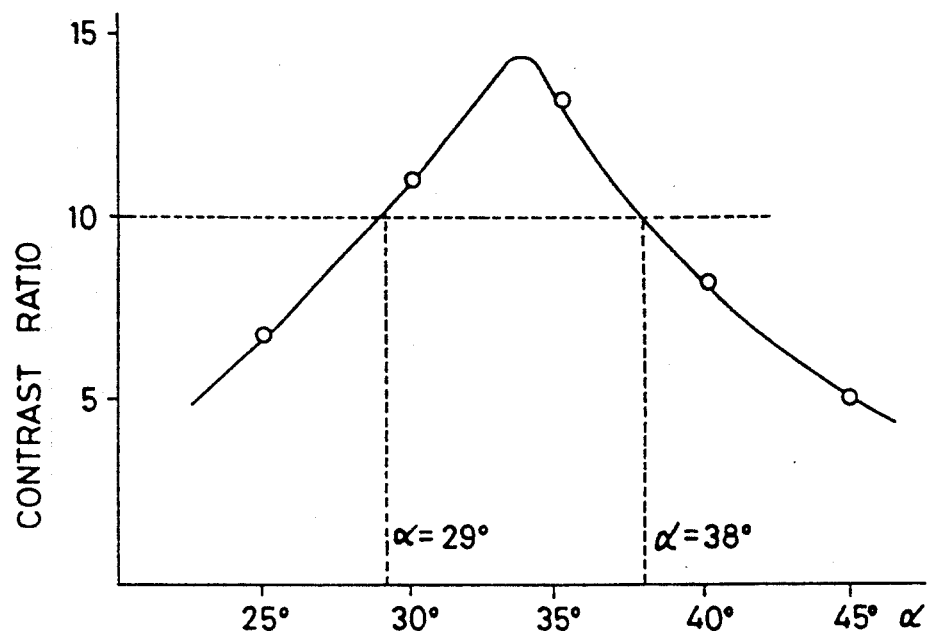
FIGS. 10 and 11 are graphs showing a contrast ratio depending on an angle of an absorption axis of a polarizing plate to a phase retarding axis of a phase plate.

The graph of FIG. 10 shows a relationship between an angle $\alpha$ of the absorption axis P9 of the upper polarizing plate 9 to the slow axis P11 of the negative phase plate 11 and a contrast ratio with the tilt angle $\psi_T=0°$. The abscissa represents an angle $\alpha$ and the ordinate represents a contrast ratio. In this graph, the angle $\theta 1$ of the orienting axis P6 of the upper orienting film 6 to the slow axis P11 of the negative phase plate 11 is set to 75°, the angle $\theta 2$ of the orienting axis P7 of the lower orienting film 7 to the slow axis P12 of the positive phase plate 12 is set to 70°, the angle $\beta$ of the slow axis P12 of the positive phase plate 12 to the absorption axis P10 of the lower polarizing plate 10 is set to 60° and the other orientational relations are not changed. It can be seen from FIG. 10 that the angle $\alpha$ at which a contrast ratio of 10 or more necessary for practical liquid crystal display can be obtained at a tilt angle $\psi_T=0°$ is within the range from 29° to 38°.

Figure 11:
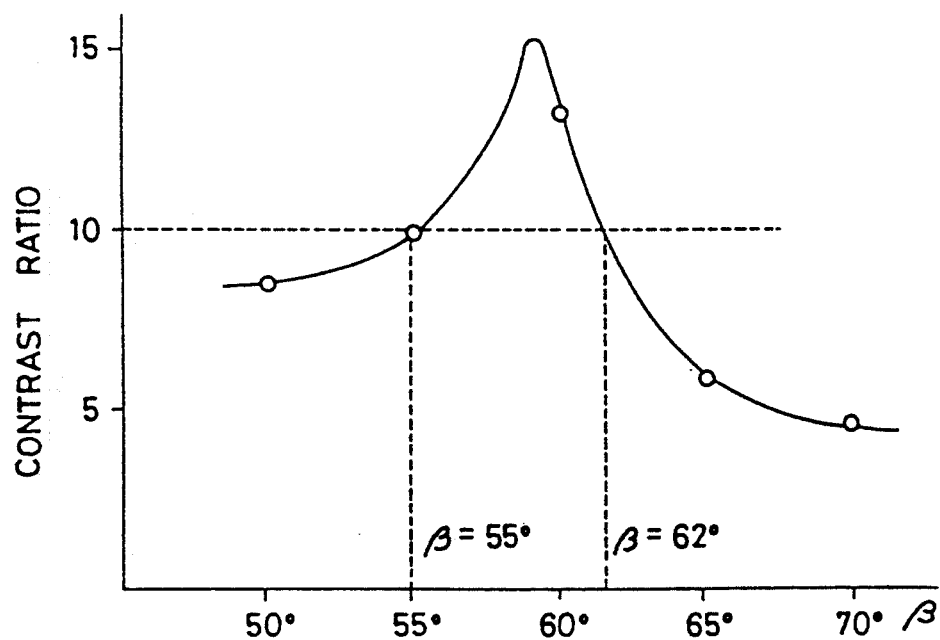

The graph of FIG. 11 shows a relationship between an angle $\beta$ of the slow axis P12 of the positive phase plate 12 to the absorption axis P10 of the lower polarizing plate 10 of FIG. 7 and a contrast ratio with the tilt angle $\psi_T=0°$, where the abscissa represents an angle $\beta$ and the ordinate represents a contrast ratio. In the graph, $\theta 1$ is set to 75°, $\theta 2$ to 70° and $\alpha$ to 35°, while the other orientational relations are not changed. It can be seen from FIG. 11 that the angle $\beta$ at which a contrast ratio of 10 or more can be obtained is within the range from 55° to 62°.

With another reference to FIG. 6, a liquid crystal display apparatus according to a second embodiment of the present invention will be described. The liquid crystal display apparatus according to the second embodiment is similar to that according to the first embodiment with a difference being that the negative phase plate 11 and the positive phase plate 12 are replaced by each other. In addition, nematic liquid crystal including CN of 1.77 wt. % is used and refractive index anisotropy $\Delta n$ of the liquid crystal panel 1 is 0.125 in this second embodiment.

Figure 12:
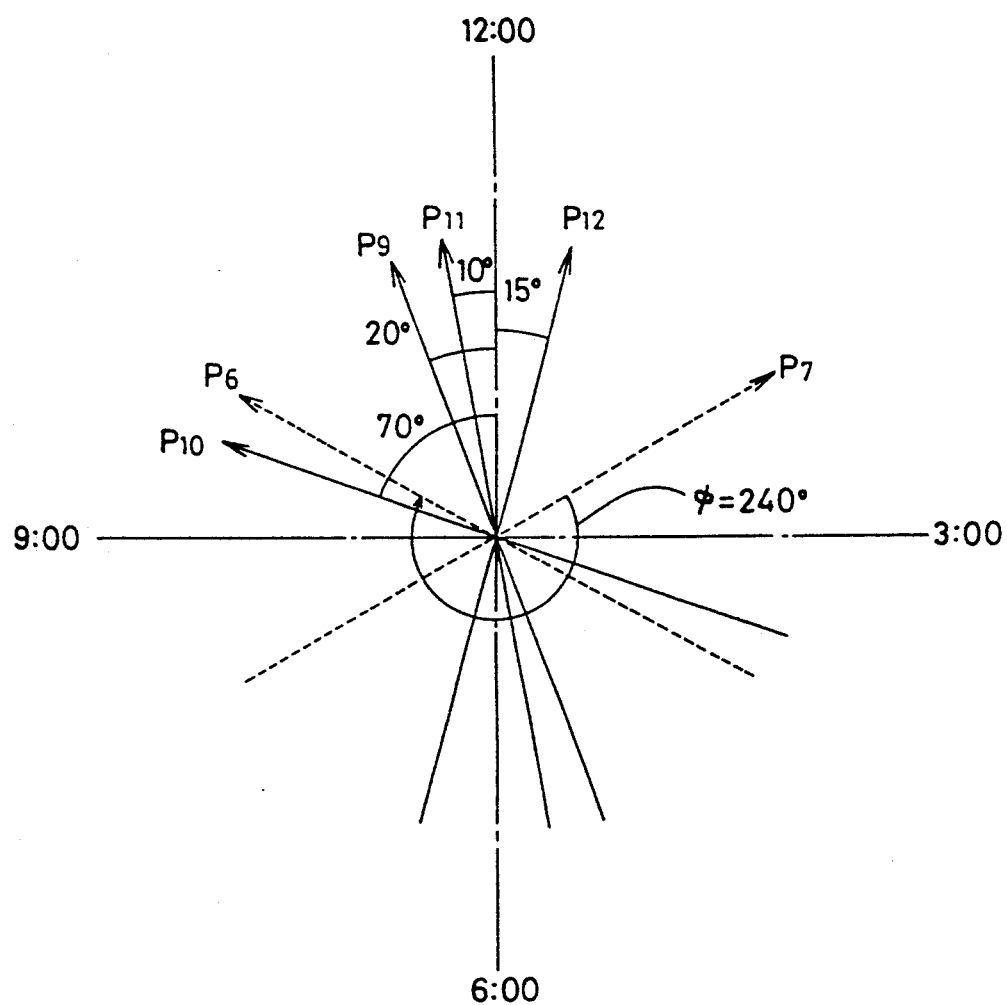
FIG. 12 is a diagram showing an orientational relationship among the components of a liquid crystal display apparatus according to a second embodiment of the present invention.

FIG. 12, similar to FIG. 7, shows one example of an optical orientational relationship among the components of the liquid crystal display apparatus according to the second embodiment.

Figure 13:
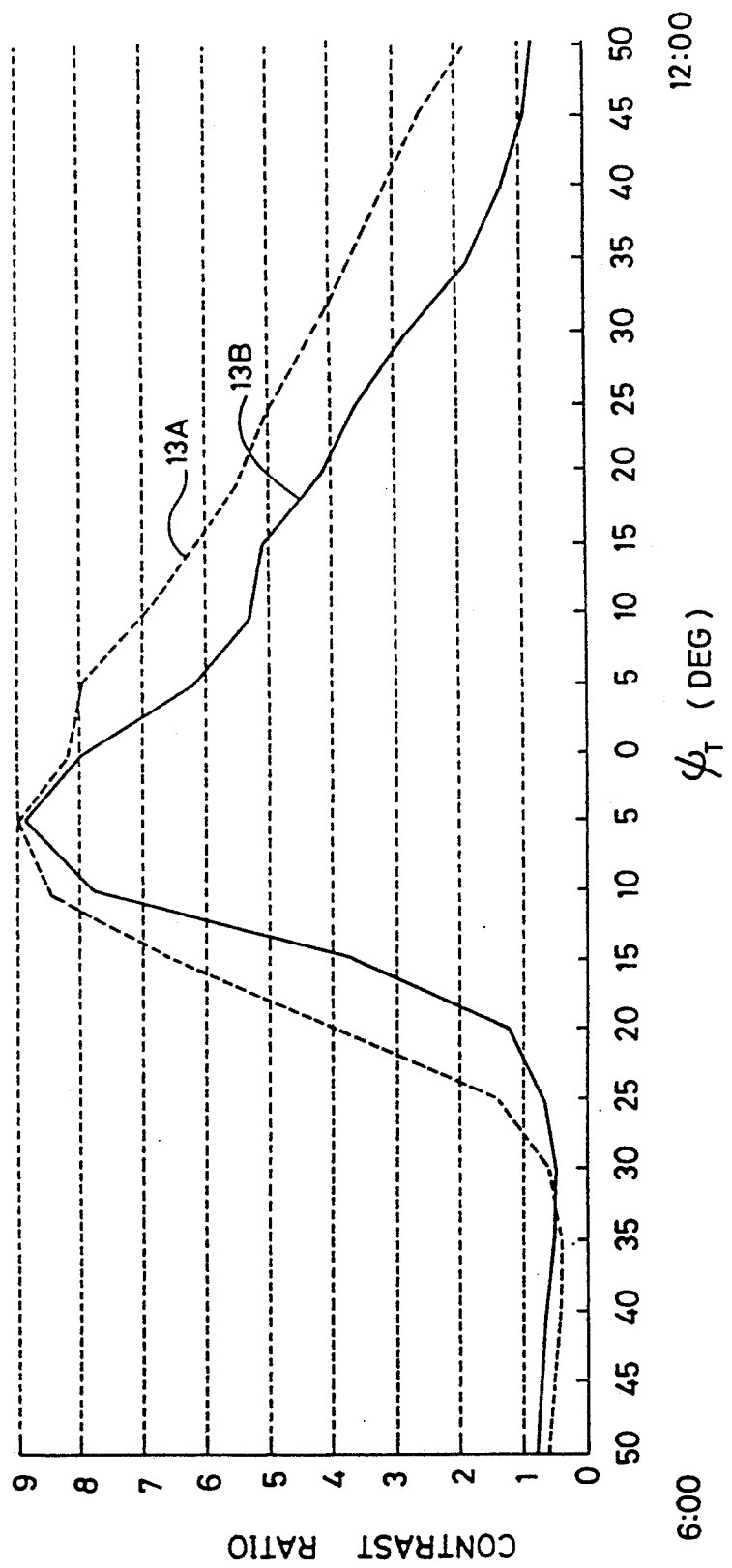
FIG. 13 is a graph showing a contrast ratio of display depending on a tilt angle $\psi_T$ along the direction of 12:00-6:00 in the liquid crystal display apparatus according to the second embodiment.

FIG. 13, similar to FIG. 8, shows a contrast ratio depending on a tilt angle $\psi_T$ along the direction of 12:00–6:00 of the liquid crystal display apparatus according to the second embodiment. The curve 13A represents a contrast ratio of the liquid crystal display apparatus according to the second embodiment, while the curve 13B represents a contrast ratio of the liquid crystal display apparatus according to Japanese Patent Laying-Open No. 3-73921. The liquid crystal display apparatus according to Japanese Patent Laying-Open No. 3-73921, similar to that according to the second embodiment, has a positive phase plate replacing the lower negative phase plate 11.

In the graph of FIG. 13, the range of the tilt angle $\psi_T$ at which a contrast ratio of 4 or more can be obtained is within 52° for the curve 13A and within 35° for the curve 13B. That is, a viewing angle range in which a contrast ratio of 4 or more can be obtained in the liquid crystal display apparatus according to the second embodiment is 1.5 times that of Japanese Patent Laying-Open No. 3-73921.

Figure 14:
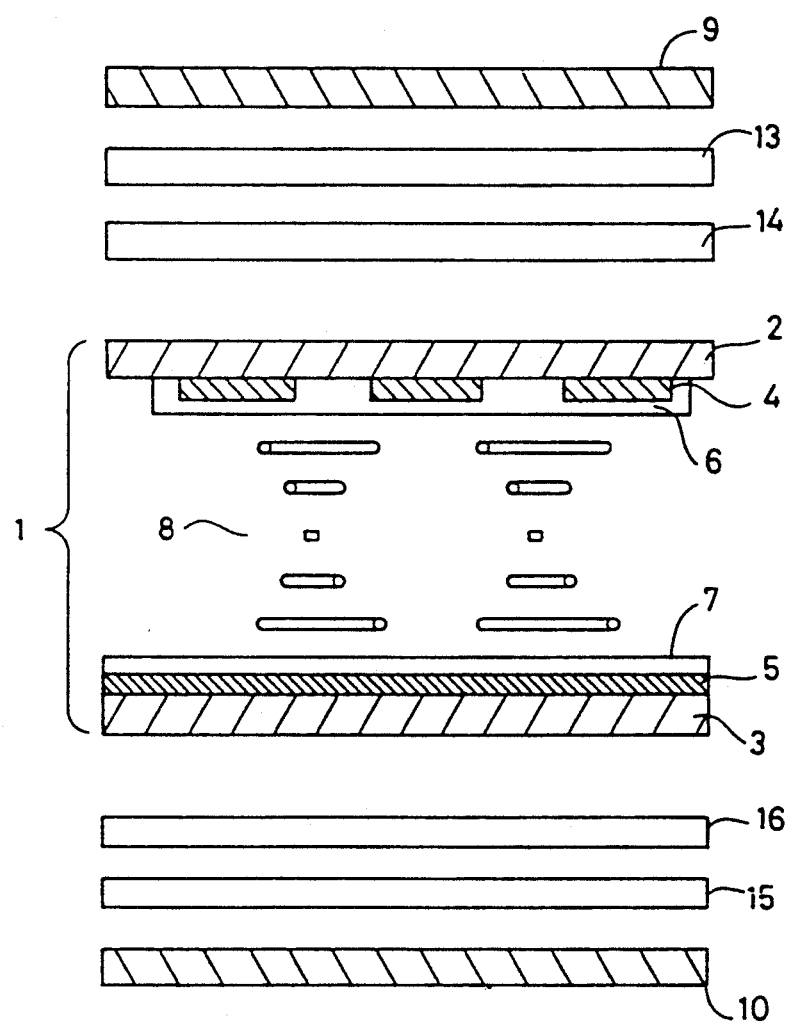
FIG. 14 is an exploded sectional view showing a liquid crystal display apparatus according to a third embodiment of the present invention.

FIG. 14 is an exploded sectional view of a liquid crystal display apparatus according to a third embodiment of the present invention. The liquid crystal display apparatus of FIG. 14, similar to that of FIG. 6 according to the first embodiment, has a negative phase plate 13 and a positive phase plate 14 replacing the upper negative phase plate 11 and a negative phase plate 15 and a positive phase plate 16 replacing the lower positive phase plate 12. Each of the positive phase plates 14 and 16 has a thickness of 25 $\mu$m and a retardation of 210 nm. Each of the negative phase plates 13 and 15 also has a thickness of 25 $\mu$m and a retardation of 210 nm. In addition, the third embodiment employs nematic liquid crystal including CN of 1.45 wt. % wherein refractive index anisotropy $\Delta n$ of the liquid crystal panel 1 is 0.123.

One example of an optical orientational relationship among the components of the liquid crystal display apparatus shown in FIG. 14 can be the same as that shown in FIG. 7, in which slow axes of a pair of upper negative and positive phase plates 13 and 14 adjacent to each other are arranged in parallel to the line P11 of FIG. 7. Slow axes of another pair of lower negative and positive phase plates 15 and 16 adjacent to each other are also arranged in parallel to the line P12 of FIG. 7.

The coincidence of the slow axes of adjacent positive and negative phase plates is required to compensate for the orientation dependency of the retardation of the positive phase plate by the reverse orientation dependency of the negative phase plate. An angle of the phase retarding axis of the positive phase plate to that of the negative phase plate is preferably 10° or less in order to compensate for the orientation dependency of retardation between positive and negative phase plates adjacent to each other.

Figure 15:
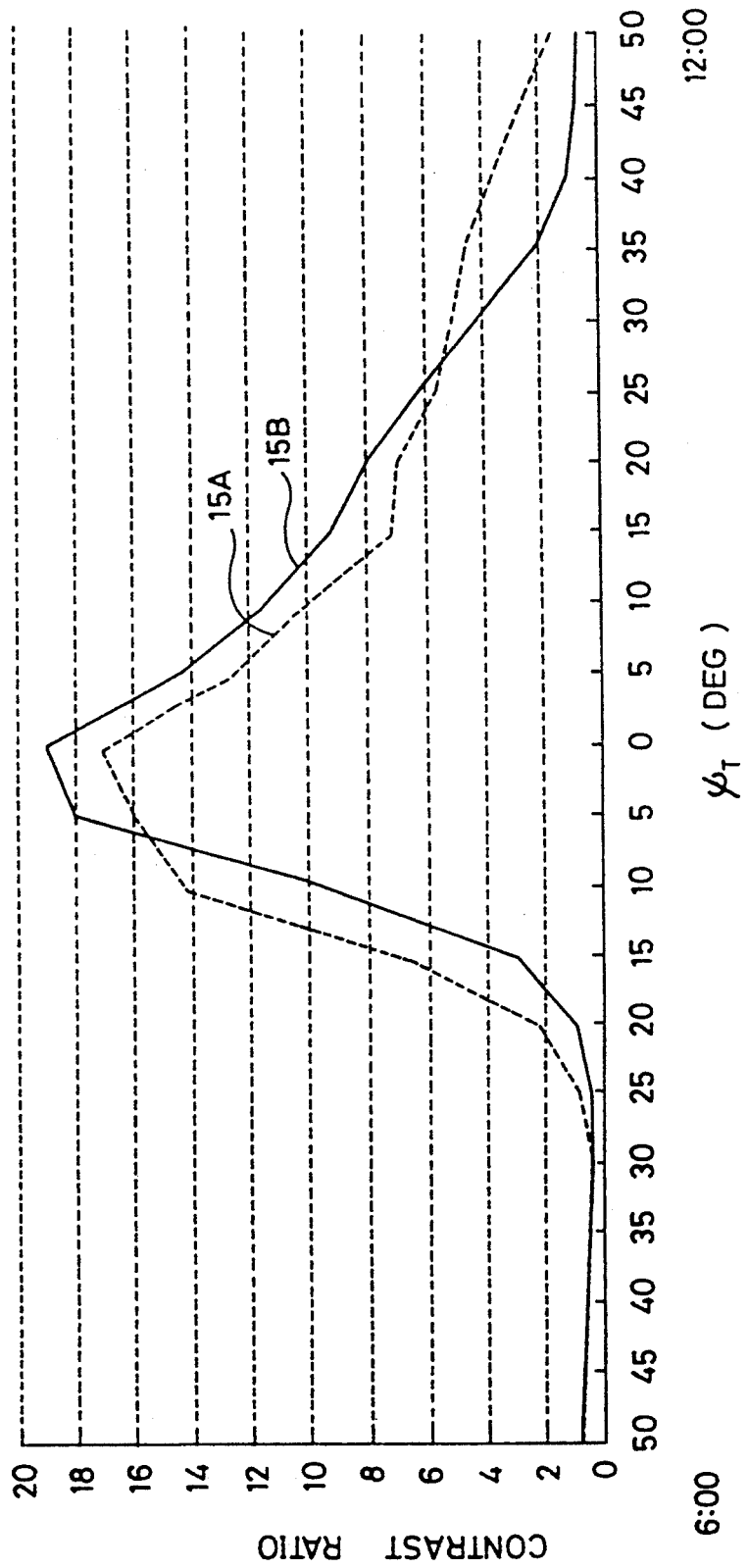
FIG. 15 is a graph showing a contrast ratio of display depending on a tilt angle $\psi_T$ along the direction of 12:00-6:00 in the liquid crystal display apparatus of FIG. 14.

FIG. 15, similar to FIG. 8, shows a contrast ratio depending on a tilt angle $\psi_T$ along the direction of 12:00–6:00 in the liquid crystal display apparatus of FIG. 14. The curve 15A represents a contrast ratio of the liquid crystal display apparatus of FIG. 14, while the curve 15B represents a contrast ration of the liquid crystal display apparatus according to Japanese Patent Laying-Open No. 3-73921. The liquid crystal display apparatus according to Japanese Patent Laying-Open No. 3-73921 is similar to that shown in FIG. 14, with positive phase plates replacing the upper and the lower negative phase plates 13 and 15.

In the graph of FIG. 15, the range of the tilt angle $\psi_T$ at which a contrast ratio of 4 or more can be obtained is within 57° for the curve 15A and within 44° for the curve 15B. That is, the range of a viewing angle in which a contrast ratio of 4 or more can be obtained in the liquid crystal display apparatus of FIG. 14 is 1.3 times that of Japanese Patent Laying-Open No. 3-73921.

Figure 16:
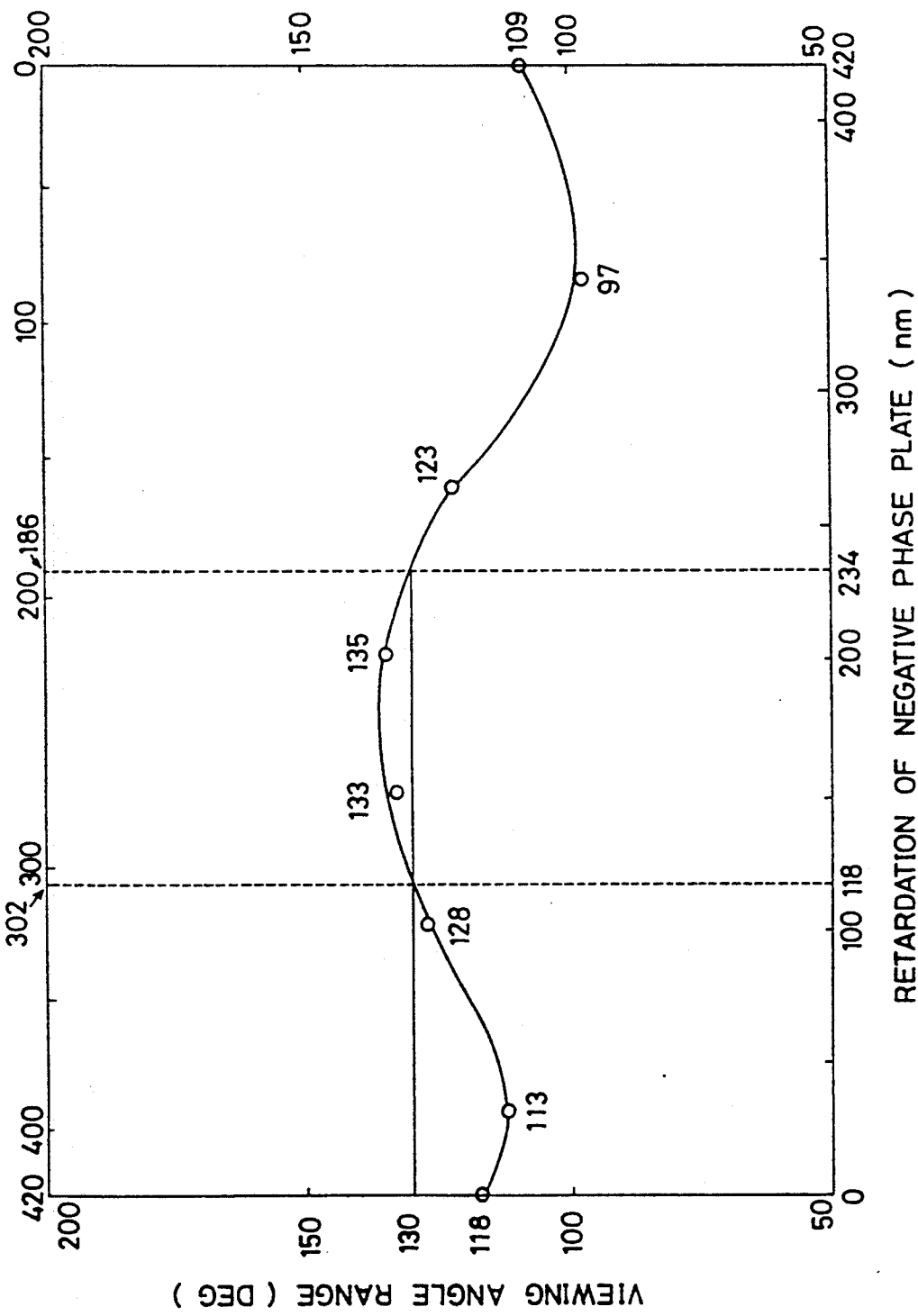
FIG. 16 is a graph showing a viewing angle range depending on a combination of retardation of positive and negative phase plates in the liquid crystal display apparatus of FIG. 14.

A graph of FIG. 16 shows a preferable range of a viewing angle depending on the combination of retardations of the negative and positive phase plates in each of a pair of the negative and positive phase plates 13 and 14 and another pair of the negative and positive phase plates 15 and 16. In the graph, the lower abscissa represents retardation R (negative) of the negative phase plate and the upper abscissa represents retardation R (positive) of the positive phase plate. A sum of the retardation R (negative) of the negative phase plate and the retardation (positive) of the positive phase plate is set to 420 nm. The ordinate represents a sum of the range of a viewing angle along the direction of 12:00–6:00 and the range of a viewing angle along the direction of 3:00–9:00 in which a contrast ratio of 4 or more can be obtained.

It can be seen that the liquid crystal display apparatus according to Japanese Patent Laying-Open No. 3-73921 corresponds to a case where R (negative)=0 nm and R (positive)=420 nm and a preferable viewing angle range in which a contrast ratio of 4 or more can be obtained is 118°. It can be also seen from the graph of FIG. 16 that a preferable viewing angle range of 130° (118°×1.1) or more, a 10% or more improvement of this preferable viewing angle range of 118°, can be obtained when the retardation R (negative) of the negative phase plate is in the range of 118–234 nm and the retardation R (positive) of the positive phase plate in the range of 302–186 nm. At this time, calculations of ratios of R (negative) and R (positive) to the total retardation of the pair of the positive and negative phase plates is result in R (negative)/420=0.28−0.56 and R (positive)/420=0.72−0.44.

Figure 17:
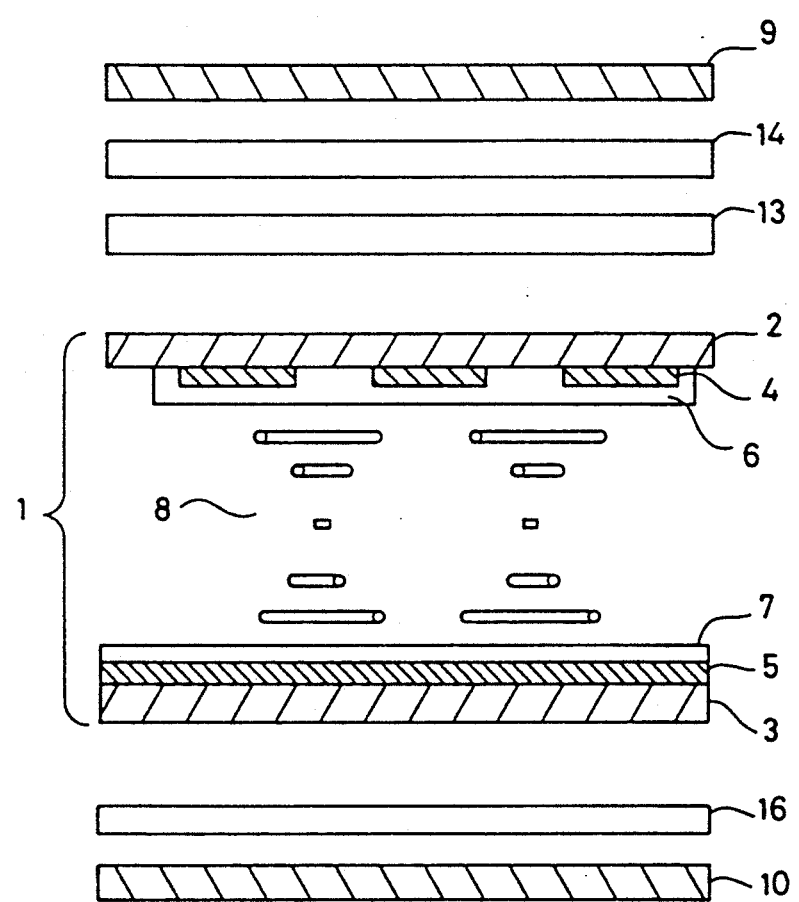
FIG. 17 is an exploded sectional view showing a liquid crystal display apparatus according to a fourth embodiment of the present invention.

FIG. 17 is an exploded sectional view of a liquid crystal display apparatus according to a fourth embodiment of the present invention. The liquid crystal display apparatus of FIG. 17, similar to that of FIG. 14, includes the upper negative phase plate 13 and positive phase plate 14 replaced by each other, with the lower negative phase plate 15 omitted. The lower positive phase plate 16 has a thickness of 50 μm and retardation of 420 nm.

Figure 18:
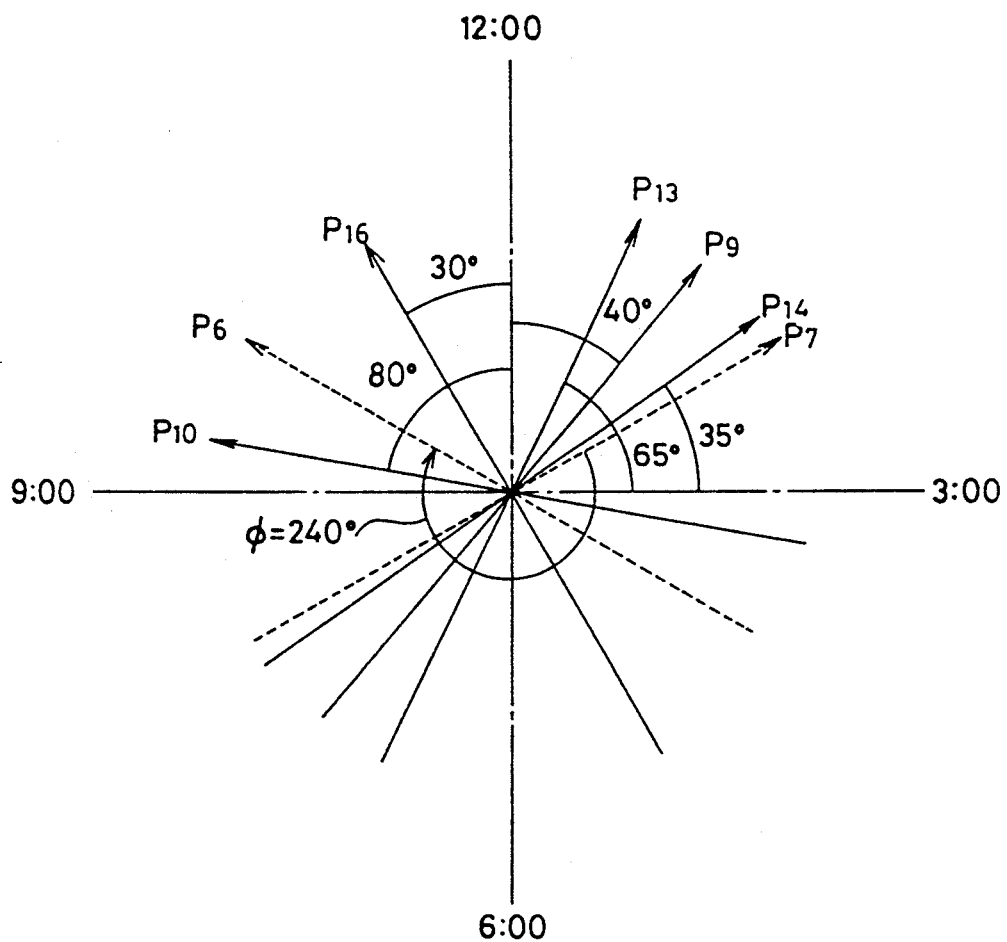
FIG. 18 is a diagram showing an orientational relationship among the components of the liquid crystal display apparatus of FIG. 17.

FIG. 18, similar to that of FIG. 7, shows one example of an optical orientational relationship among the components of the liquid crystal display apparatus of FIG. 17. The lines P13 and P14 represent slow axes of the upper negative and positive phase plates 13 and 14, respectively and the line P16 represents a slow axis of the lower positive phase plate 16.

At this time, as can be seen from FIG. 18, the slow axis P14 of the positive phase plate 14 is rotated counterclockwise by 35° from the direction of 3:00–9:00, which direction is in the range of an azimuth angle <COD in which the retardation has a little dependence on the tilt angle. It can be also seen that the slow axis P13 of the negative phase plate 13 is rotated counterclockwise by 65° from the direction of 3:00–9:00, which direction is in the range of an azimuth angle in which retardation of the negative phase plate 13 has a little dependence on the tilt angle.

As described in the foregoing, for a certain direction to be in the azimuth angle range in which retardation of each of positive and negative phase plates has a little dependence on the tilt angle, a slow axis of the positive phase plate should be rotated clockwise by an angle in the range of 0°–40° with respect to a slow axis of the negative phase plate.

FIG. 19, similar to FIG. 8, shows a contrast ratio depending on a tilt angle $\psi_T$ along the direction of 3:00–9:00 in the liquid crystal display apparatus of FIG. 17. The curve 19A represents a contrast ratio of the liquid crystal display apparatus of FIG. 17, while the curve 19B represents a contrast ratio of the liquid crystal display apparatus according to Japanese Patent Laying-Open No. 3-73921. The liquid crystal display apparatus according to Japanese Patent Laying-Open No. 3-73921, similar to that of FIG. 17, includes a positive phase plate replacing the lower negative phase plate 13.

In the graph of FIG. 19, the range of the tilt angle $\psi_T$ in which a contrast ratio of 4 or more can be obtained is within 73° for the curve 19A and within 59° for the curve 19B. That is, the range of a viewing angle in which a contrast ratio of 4 or more can be obtained in the liquid crystal display apparatus of FIG. 17 is 1.2 times that of Japanese Patent Laying-Open No. 3-73921.

As described above, the present invention enables prevention of coloring and reduction of contrast of display in a black and white liquid crystal display apparatus in a large viewing angle range by arranging positive and negative phase plates so as to compensate for a change of retardation due to a change of a tilt angle. Therefore, in such a large-sized liquid crystal display apparatus as having 1120×800 dots, it is possible to prevent coloring and reduction of contrast in the entire display surface. In addition, by using a color filter or the like, such a liquid crystal display apparatus capable of performing stable black and white display can be used to implement a color liquid crystal display apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display apparatus comprising:
 a supertwisted nematic liquid crystal panel including a liquid crystal layer provided between first and second transparent substrates;
 a first phase plate group including at least one uniaxially stretched polymer film arranged on the outer surface of said first substrate;
 a first polarizing plate arranged on said first phase plate group;
 a second phase plate group including at least one uniaxially stretched polymer film arranged on the outer surface of said second substrate; and
 a second polarizing plate arranged on said second phase plate group;
 one of said first and second phase plate groups including a uniaxially stretched polymer film having positive optical anisotropy and the other one of said first and second phase plate groups including a uniaxially stretched polymer film having negative optical anisotropy, wherein an angle of a first liquid crystal molecule orienting axis on the inner surface of said first substrate to an effective slow axis of the first phase plate group and an angle of a second liquid crystal molecule orienting axis on the inner surface of the second substrate to an effective slow axis of said second phase plate group are each within the range of 62° to 77°.

2. The liquid crystal display apparatus of claim 1, wherein
 an angle of an absorption axis of said first polarizing plate to the effective slow axis of said first phase plate group is within the range of 29° to 38°, and
 an angle of an absorption axis of said second polarizing plate to the effective slow axis of said second phase plate group is within the range of 55° to 62°.

3. The liquid crystal display apparatus of claim 1, wherein
 said first phase plate group includes first and second uniaxially stretched polymer films stacked on the outer surface of said first substrate, one of said first and second uniaxially stretched polymer films having positive optical anisotropy and the other having negative optical anisotropy,
 said second phase plate group includes third and fourth uniaxially stretched polymer films stacked on the outer surface of said second substrate, one of said third and fourth uniaxially stretched polymer films having positive optical anisotropy, and the other having negative optical anisotropy, and
 an angle of a slow axis of said first uniaxially stretched polymer film to a slow axis of said second uniaxially stretched polymer film and an angle of a slow axis of said third uniaxially stretched polymer film to a slow axis of said fourth uniaxially stretched polymer film are each within the range of 0° to 10°.

4. The liquid crystal display apparatus of claim 3, wherein an angle of a first liquid crystal molecule orienting axis on the inner surface of said first substrate to the slow axis of said uniaxially stretched first polymer film and an angle of a second liquid crystal molecule orienting axis on the inner surface of said second substrate to the slow axis of said third uniaxially stretched polymer film are each within the range of 62° to 77°.

5. The liquid crystal display apparatus of claim 4, wherein
 an angle of the absorption axis of said first polarizing plate to the slow axis of said second uniaxially stretched polymer film is within the range of 29° to 38°, and
 an angle of the absorption axis of said second polarizing plate to the slow axis of said fourth uniaxially stretched polymer film is within the range of 55° to 62°.

6. The liquid crystal display apparatus of claim 3, wherein
 an angle of an absorption axis of said first polarizing plate to the slow axis of said second uniaxially stretched polymer film is within the range of 29° to 38°, and
 an angle of an absorption axis of said second polarizing plate to the slow axis of said fourth uniaxially stretched polymer film is within the range of 55° to 62°.

7. The liquid crystal display apparatus of claim 2, wherein
 an angle of the absorption axis of said first polarizing plate to the effective slow axis of said first phase plate group is within the range of 29° to 38°, and
 an angle of the absorption axis of said second polarizing plate to the effective slow axis of said second phase plate group is within the range of 55° to 62°.

8. The liquid crystal display apparatus of claim 1, wherein
 said first phase plate group includes first and second uniaxially stretched polymer films stacked on the outer surface of said first substrate, one of said first and second uniaxially stretched polymer films having positive optical anisotropy and the other having negative optical anisotropy,
 said second phase plate group includes a third uniaxially stretched polymer film on the outer surface of said second substrate, and
 in said first phase plate group, a slow axis of the one of said first and second uniaxially stretched polymer films which has a positive optical anisotropy is rotated clockwise with respect to a slow axis of the one of said first and second uniaxially stretched polymer films which has a negative optical anisotropy by an angle within the range of 0° to 40°.

9. The liquid crystal display apparatus of claim 8, wherein
 an angle of the absorption axis of said first polarizing plate to the effective slow axis of said first phase plate group is within the range of 29° to 38°, and
 an angle of the absorption axis of said second polarizing plate to the effective slow axis of said second phase plate group is within the range of 55° to 62°.

10. The liquid crystal display apparatus of claim 1, wherein
 said first phase plate group includes first and second uniaxially stretched polymer films stacked on the outer surface of said first substrate, one of said first and second uniaxially stretched polymer films having positive optical anisotropy and the other having negative optical anisotropy,
 said second phase plate group includes a third uniaxially stretched polymer film on the outer surface of said second substrate,
 an angle of a first liquid crystal molecule orienting axis on the inner surface of said first substrate to the slow axis of said first uniaxially stretched polymer film and an angle of a second liquid crystal molecule orienting axis on the inner surface of said second substrate to the slow axis of said third uniaxially stretched polymer film are each within the range of 62° to 77°, and in said first phase plate group, a slow axis of the one of said first and second uniaxially stretched polymer films which has a positive optical anisotropy is rotated clockwise with respect to a slow axis of the one of said first and second uniaxially stretched polymer films which has a negative optical anisotropy by an angle within the range of 0° to 40°.

11. A liquid crystal display apparatus comprising:

a supertwisted nematic liquid crystal panel including a liquid crystal layer provided between first and second transparent substrates;

a first phase plate group including at least one positive uniaxially stretched polymer film arranged on the outer surface of said first substrate;

a first polarizing plate arranged on said first phase plate group;

a second phase plate group including at least one negative uniaxially stretched polymer film arranged on the outer surface of said second substrate; and a second polarizing plate arranged on said second phase plate group, wherein an angle of an absorption axis of said first polarizing plate to the effective slow axis of said first phase plate group is within the range of 29° to 38°, and an angle of an absorption axis of said second polarizing plate to the effective slow axis of said second phase plate group is within the range of 55° to 62°.

12. The liquid crystal display apparatus of claim 11, wherein said first phase plate group includes first and second uniaxially stretched polymer films stacked on the outer surface of said first substrate, one of said first and second uniaxially stretched polymer films having positive optical anisotropy and the other having negative optical anisotropy, said second phase plate group includes third and fourth uniaxially stretched polymer films stacked on the outer surface of said second substrate, one of said third and fourth uniaxially stretched polymer films having positive optical anisotropy and the other having negative optical anisotropy, and an angle of a slow axis of said first uniaxially stretched polymer film to a slow axis of said second uniaxially stretched polymer film and an angle of a slow axis of said third uniaxially stretched polymer film to a slow axis of said fourth uniaxially stretched polymer film are each within the range of 0° to 10°.

13. The liquid crystal display apparatus of claim 12, wherein an angle of a first liquid crystal molecule orienting axis on the inner surface of said first substrate to the slow axis of said uniaxially stretched first polymer film and an angle of a second liquid crystal molecule orienting axis on the inner surface of said second substrate to the slow axis of said third uniaxially stretched polymer film are each within the range of 62° to 77°.

14. The liquid crystal display apparatus of claim 13, wherein an angle of absorption axis of said first polarizing plate to the slow axis of said second uniaxially stretched polymer film is within the range of 29° to 38°, and an angle of the absorption axis of said second polarizing plate to the slow axis of said fourth uniaxially stretched polymer film is within the range of 55° to 62°.

15. The liquid crystal display apparatus of claim 12, wherein an angle of absorption axis of said first polarizing plate to the slow axis of said second uniaxially stretched polymer film is within the range of 29° to 38°, and an angle of absorption axis of said second polarizing plate to the slow axis of said fourth uniaxially stretched polymer film is within the range of 55° to 62°.

16. The liquid crystal display apparatus claim 11, wherein said first phase plate group includes first and second uniaxially stretched polymer films stacked on the outer surface of said first substrate, one of said first and second uniaxially stretched polymer films having positive optical anisotropy and the other having negative optical anisotropy, said second phase plate group includes a third uniaxially stretched polymer film on the outer surface of said second substrate, and in said first phase plate group, a slow axis of the one of said first and second uniaxially stretched polymer films which has a positive optical anisotropy is rotated clockwise with respect to a slow axis of the one of said first and second uniaxially stretched polymer films which has a negative optical anisotropy by an angle within the range of 0° to 40°.

17. The liquid crystal display apparatus comprising:

a supertwisted nematic liquid crystal panel including a liquid crystal layer provided between first and second transparent substrates;

a first phase plate group including at least one uniaxially stretched polymer film arranged on the outer surface of said first substrate;

a first polarizing plate arranged on said first phase plate group;

a second phase plate group including at least one uniaxially stretched polymer film arranged on the outer surface of said second substrate; and a second polarizing plate arranged on said second phase plate group;

said first phase plate group includes first and second uniaxially stretched polymer films stacked on the outer surface of said first substrate, one of said first and second uniaxially stretched polymer films having positive optical anisotropy and the other having negative optical anisotropy, said second phase plate group includes third and fourth uniaxially stretched polymer films stacked on the outer surface of said second substrate, one of said third and fourth uniaxially stretched polymer films having positive optical anisotropy and the other having negative optical anisotropy, and an angle of a slow axis of said first uniaxially stretched polymer film to a slow axis of said second uniaxially stretched polymer film and an angle of a slow axis of said third uniaxially stretched polymer film to a slow axis of said fourth uniaxially stretched polymer film are each within the range of 0° to 10°.

18. The liquid crystal display apparatus of claim 17, wherein an angle of a first liquid crystal molecule orienting axis on the inner surface of said first substrate to the slow axis of said uniaxially stretched first polymer film and an angle of a second liquid crystal molecule orienting axis on the inner surface of said second substrate to the slow axis of said third uniaxially stretched polymer film are each within the range of 62° to 77°.

19. The liquid crystal display apparatus of claim 18, wherein an angle of an absorption axis of said first polarizing plate to the slow axis of said second uniaxially stretched polymer film is within the range of 29° to 38°, and an angle of an absorption axis of said second polarizing plate to the slow axis of said fourth uniaxially stretched polymer film is within the range of 55° to 62°.

20. A liquid crystal display apparatus comprising:
a supertwisted nematic liquid crystal panel including a liquid crystal layer provided between first and second transparent substrates;
a first phase plate group including at least one uniaxially stretched polymer film arranged on the outer surface of said first substrate;
a first polarizing plate arranged on said first phase plate group;
a second phase plate group including at least one uniaxially stretched polymer film arranged on the outer surface of said second substrate; and
a second polarizing plate arranged on said second phase plate group; wherein
said first phase plate group includes first and second uniaxially stretched polymer films stacked on the outer surface of said first substrate, one of said first and second uniaxially stretched polymer films having positive optical anisotropy and the other having negative optical anisotropy,
said second phase plate group includes a third uniaxially stretched polymer film on the outer surface of said second substrate, and
in said first phase plate group, a slow axis of the one of said first and second uniaxially stretched polymer films which has a positive optical anisotropy is rotated clockwise with respect to a slow axis of the one of said first and second uniaxially stretched films which has a negative optical anisotropy by an angle within the range of 0° to 40°.

21. The liquid crystal display apparatus of claim 20, wherein an angle of a first liquid crystal molecule orienting axis on the inner surface of said first substrate to the slow axis of said uniaxially stretched first polymer film and an angle of a second liquid crystal molecule orienting axis on the inner surface of said second substrate to the slow axis of said third uniaxially stretched polymer film are each within the range of 62° to 77°.

22. The liquid crystal display apparatus of claim 21, wherein said second phase plate group further includes a fourth uniaxially stretched polymer film on the outer surface of said second substrate, an angle of the absorption axis of said first polarizing plate to the slow axis of said second uniaxially stretched polymer film is within the range of 29° to 38°, and an angle of the absorption axis of said second polarizing plate to the slow axis of said fourth uniaxially stretched polymer film is within the range of 55° to 62°.

23. The liquid crystal display apparatus of claim 20, wherein said second phase plate group further includes a fourth uniaxially stretched polymer film on the outer surface of said second substrate, an angle of an absorption axis of said first polarizing plate to the slow axis of said second uniaxially stretched polymer film is within the range of 29° to 38°, and an angle of an absorption axis of said second polarizing plate to the slow axis of said fourth uniaxially stretched polymer film is within the range of 55° to 62°.

* * * * *